US012509341B2

(12) United States Patent
Song

(10) Patent No.: US 12,509,341 B2
(45) Date of Patent: Dec. 30, 2025

(54) SODA MACHINE WITH AUTOMATIC GAS FILLING AND RESIDUAL AMOUNT DETECTION FUNCTIONS AND USE METHOD THEREOF

(71) Applicant: JIANGMEN YIKEMAITE ELECTRONIC TECHNOLOGY CO., LTD, Jiangmen (CN)

(72) Inventor: Tony Song, Jiangmen (CN)

(73) Assignee: JIANGMEN YIKEMAITE ELECTRONIC TECHNOLOGY CO., LTD, Jiangmen (CN)

( * ) Notice: Subject to any disclaimer, the term of this patent is extended or adjusted under 35 U.S.C. 154(b) by 162 days.

(21) Appl. No.: 18/601,209

(22) Filed: Mar. 11, 2024

(65) Prior Publication Data
US 2024/0208789 A1 Jun. 27, 2024

Related U.S. Application Data

(63) Continuation of application No. PCT/CN2022/118173, filed on Sep. 9, 2022.

(30) Foreign Application Priority Data

Nov. 17, 2021 (CN) .......................... 202111364763.0

(51) Int. Cl.
*B67D 1/00* (2006.01)
*B67D 1/12* (2006.01)

(52) U.S. Cl.
CPC ......... *B67D 1/0071* (2013.01); *B67D 1/0074* (2013.01); *B67D 1/1225* (2013.01)

(58) Field of Classification Search
CPC .. B67D 1/0071; B67D 1/0074; B67D 1/1225; A23L 2/54; B01F 23/231; B01F 23/2361;
(Continued)

(56) References Cited

U.S. PATENT DOCUMENTS 1,578,697 A * 3/1926 Young ...................... G01N 7/04
422/88
4,869,047 A * 9/1989 Nishiguchi ........ B65D 81/2084
53/268
(Continued)

FOREIGN PATENT DOCUMENTS

CN 204394246 U 6/2015
CN 107421614 A 1/2017
(Continued)

*Primary Examiner* — Donnell A Long
(74) *Attorney, Agent, or Firm* — Birchwood IP

(57) ABSTRACT

The invention discloses a soda machine with automatic gas filling and residual amount detection functions and a use method thereof. Compared with the prior art, the soda machine is safer to operate, cannot carry out automatic gas filling under the condition that the operation of the soda machine is not standard and can only carry out manual gas filling by a user under a special condition, so that the safety is higher; and meanwhile, the amount of residual carbon dioxide gas can be measured in real time according to the weight of the carbon dioxide gas cylinder, so that the user can conveniently prepare the standby carbon dioxide gas cylinder in time, and more convenience is achieved.

11 Claims, 12 Drawing Sheets

(58) Field of Classification Search
CPC ........ B01F 35/2117; A47J 31/00; A47J 31/40; G01G 19/62; G01L 19/00; G01L 19/12; G01M 3/26
See application file for complete search history.

(56) References Cited

U.S. PATENT DOCUMENTS

| | | | | |
|---|---|---|---|---|
| 9,854,935 B2* | 1/2018 | Danieli | ............... | A47J 31/4403 |
| 2008/0105989 A1* | 5/2008 | Rona | ................. | G05D 23/1393 |
| | | | | 261/50.1 |
| 2010/0212773 A1* | 8/2010 | Clusserath | .............. | B67C 3/286 |
| | | | | 141/59 |
| 2014/0239522 A1* | 8/2014 | An | ........................ | F25D 23/126 |
| | | | | 261/121.1 |

FOREIGN PATENT DOCUMENTS

| | | | | | |
|---|---|---|---|---|---|
| CN | 108594725 | A | | 9/2018 | |
| CN | 113303668 | A | * | 8/2021 | ............. A47J 31/00 |
| CN | 214548896 | U | | 11/2021 | |
| CN | 214712063 | U | | 11/2021 | |
| CN | 113974433 | A | | 1/2022 | |
| JP | 2002037394 | A | | 2/2002 | |
| JP | 2020199254 | A | | 12/2020 | |

* cited by examiner

G-G

SODA MACHINE WITH AUTOMATIC GAS FILLING AND RESIDUAL AMOUNT DETECTION FUNCTIONS AND USE METHOD THEREOF

CROSS-REFERENCE TO RELATED APPLICATIONS

This application is a continuation of co-pending International Patent Application No. PCT/CN2022/118173, filed on Sep. 9, 2022, which claims the priority and benefit of Chinese patent application number 202111364763.0, filed on Nov. 17, 2021 with China National Intellectual Property Administration, the entire contents of which are incorporated herein by reference.

TECHNICAL FIELD

The invention relates to the field of preparation of soda water drinks, in particular to a soda machine with automatic gas filling and residual amount detection functions and a method for using the same.

BACKGROUND

An existing soda machine is not high in safety and can perform automatic gas filling in various states, making it relatively dangerous. If the machine is touched by mistake, a large amount of carbon dioxide gas will overflow into the air, which easily causes the excessively high indoor carbon dioxide concentration, or direct spraying of the high-concentration carbon dioxide gas to the people. In addition, pressure detection is generally adopted for detection of the residual amount of the carbon dioxide gas; however, relatively large gas pressure fluctuations will only be generated during pressure detection when the residual amount of the carbon dioxide gas in a carbon dioxide gas cylinder is very small, such that it is difficult for a user to timely determine whether it is needed to start to prepare a new carbon dioxide gas cylinder.

SUMMARY

In order to solve the above problem, the invention aims to provide a soda machine which is safer and capable of detecting the residual amount of carbon dioxide.

The technical solution adopted in the invention to solve the problems is as follows: a soda machine with automatic gas filling and residual amount detection functions comprises:

a main machine, wherein a body bracket is provided in the main machine, and a reminding device is provided on the main machine;
   an air inlet body, where the air inlet body is provided on the body bracket and is capable of moving up and down relative to the body bracket, a gas guide hole and an air inlet rod located in the gas guide hole are provided in the air inlet body, and a gas cylinder joint for being connected to a carbon dioxide gas cylinder is provided at a lower end of a mounting hole;
   weight sensors, where the weight sensors are provided below the air inlet body to receive the air inlet body;
   a support member, wherein the support member is pivotally connected in the main machine, and a pushing end for jacking the air inlet body from the weight sensors and a driven end for driving the support member to swing are provided on the support member;
   a machine head, wherein the machine head is pivotally connected to the main machine and is capable of swinging relative to the main machine, a machine head detection switch is provided in the main machine or the machine head, a connection port is provided at the bottom of the machine head, a driving end movably connected to the driven end is provided on the machine head, a gas path body is provided on the machine head, a gas path passage is provided in the gas path body, a gas nozzle in communication with the gas path passage is provided at a lower end of the machine head, the gas path passage is in communication with the gas guide hole by means of a gas guide pipe, and a pressure sensor in communication with the gas path passage is provided on the gas path body;
   an air inlet pressing rod, wherein a tail end of the air inlet pressing rod is pivotally connected in the main machine, the air inlet pressing rod is located above the air inlet rod and is configured to press the air inlet rod downwards, an air inlet button capable of moving up and down is provided on a surface of the main machine, the air inlet button is located above the air inlet pressing rod and is configured to press the air inlet pressing rod downwards, and a snap-fitting hole or a snap-fitting hook is provided at the bottom of the air inlet pressing rod;
   an electric control driver, wherein the electric control driver is provided in the main machine and is located below the air inlet pressing rod, a gas filling snap-fitting rod is connected to an output end of the electric control driver, the middle of the gas filling snap-fitting rod is pivotally connected in the main machine, a snap-fitting hook or a snap-fitting hole fitted with the snap-fitting hole or the snap-fitting hook is provided at a top end of the gas filling snap-fitting rod, the snap-fitting hook is snap-fitted in the snap-fitting hole in a swinging manner, and a guide surface is provided between outer side walls of the snap-fitting hook and/or the snap-fitting hole;
   an inductive switch, wherein the inductive switch is provided at a lower end of the air inlet pressing rod, and the inductive switch is triggered when the air inlet pressing rod abuts against the air inlet rod;
   a pressure water bottle assembly, where the pressure water bottle assembly comprises a submachine and a bottle body, and the pressure water bottle assembly is detachably mounted at the bottom of the machine head;
   a tilting ball switch, wherein the tilting ball switch is provided in the main machine or in the machine head; and
   a water bottle detection switch, where the water bottle detection switch is provided at the bottom of the machine head and is configured to abut against the pressure water bottle assembly for detection.

As a further improvement of the above technical solution, a connection hole for accommodating the gas cylinder joint is provided in the middle of the body bracket, limiting holes located on two sides of the connection hole are provided in the body bracket, platens located in the limiting holes are provided at a lower end of the air inlet body, there are two weight sensors which are located below the two limiting holes, respectively, an upward embedding groove is provided at a lower end of the body bracket, the top of the embedding groove is in communication with an upper end surface of the body bracket, the support member is pivotally connected in the embedding groove by means of a pivoting shaft, and the pushing end extends to the upper end of the body bracket through the top of the embedding groove and is located at the bottom of the air inlet body so as to support the air inlet body.

As a further improvement of the above technical solution, a pin is provided on the driving end, a strip-shaped groove is provided at the driving end, and the pin is inserted in the strip-shaped groove and moves in the strip-shaped groove.

As a further improvement of the above technical solution, an air inlet gland is provided on the air inlet body, two opposite pivoting shaft holes are provided in an upper surface of the air inlet gland, a through hole for accommodating the air inlet rod is provided in the middle of the air inlet gland, two pivoting columns respectively movably inserted in the two pivoting shaft holes are provided at the tail end of the air inlet pressing rod, and the air inlet rod is located at a lower end of the middle of the air inlet pressing rod.

As a further improvement of the above technical solution, a first reset spring abutting against the bottom of the air inlet pressing rod is provided on a surface of the air inlet gland, and a second reset spring for driving the gas filling snap-fitting rod to be reset is provided on the electric control driver.

As a further improvement of the above technical solution, two supporting feet provided symmetrically and expanding downwards are located at a front end of the air inlet pressing rod, end portions of the two supporting feet are connected by means of a connection rod, a cylinder platform is provided at the bottom of one of the supporting feet, the snap-fitting hole is provided in a side surface of the cylinder platform, and the air inlet button is located above the connection rod.

As a further improvement of the above technical solution, the machine head detection switch, the inductive switch and the water bottle detection switch are all inching switches.

As a further improvement of the above technical solution, the reminding device is a display screen provided on a surface of the main machine or the machine head.

A method for using the soda machine comprises a mounting method, a determination method and carbon dioxide residual amount calculation, wherein
  the mounting method is as follows: mounting the carbon dioxide gas cylinder on the gas cylinder joint, swinging the machine head upwards, mounting a soda bottle on the connection port of the machine head, resetting the machine head downwards, pressing the air inlet button to enable an automatic gas filling mode to inject carbon dioxide gas into the soda bottle for preparation of soda water, and switching to a manual gas filling mode when the automatic gas filling mode cannot be enabled, wherein
  in the automatic gas filling mode, the electric control driver drives the gas filling snap-fitting rod to move to an operation position, the air inlet button is pressed so as to drive the air inlet pressing rod to be pressed downwards, the electric control driver drives the gas filling snap-fitting rod and the air inlet pressing rod to be fixed by means of the snap-fitting hole and the snap-fitting hook, so as to automatically and continuously press the air inlet rod downwards, when the downward pressing time reaches specified time or a pressure value is reached in the pressure water bottle assembly, the electric control driver drives the gas filling snap-fitting rod to swing to be reset, the air inlet pressing rod is released, thereby allowing the air inlet pressing rod to be reset; and
  in the manual gas filling mode, the gas filling snap-fitting rod is located in an initial position, and the air inlet button is pressed continuously, such that the air inlet pressing rod continuously presses the air inlet rod downwards under the manual action;
  the determination method is as follows:
  determining whether the soda machine is connected to a power supply, and if the soda machine is not connected to the power supply, the electric control driver is not energized and the automatic gas filling mode is unable to be enabled;
  determining a tilt angle of the soda machine by means of the tilting ball switch and if the tilt of the soda machine exceeds a specified value, the automatic gas filling mode is unable to be enabled or the automatic gas filling mode is disabled;
  determining whether the pressure water bottle assembly is mounted, if the pressure water bottle assembly is not mounted on the machine head, the pressure water bottle assembly is unable to be detected by the water bottle detection switch, such that the soda machine is unable to enable the automatic gas filling mode; and
  determining whether the machine head is reset, if the machine head is not reset to a specified position by swinging downwards and the machine head is unable to be detected by the machine head detection switch, such that the soda machine is unable to enable the automatic gas filling mode, wherein
  in the automatic gas filling mode, if no pressure rise is detected by the pressure sensor, it is determined that the bottle body of the pressure water bottle assembly is not mounted, and the automatic gas filling mode is disabled;
  in the automatic gas filling mode, if a slow pressure rise is detected by the pressure sensor, it is determined that the gas amount of the carbon dioxide gas cylinder is insufficient, and prompting is performed by means of the reminding device; and
  in the automatic gas filling mode, if a certain pressure rise is detected by the pressure sensor but the specified pressure is never reached, it is determined that there is a gas leakage fault, and prompting is performed by means of the reminding device; and
  the carbon dioxide residual amount calculation is as follows: driving, by means of the machine head, the support member to swing in an upward swinging process, such that the pushing end jacks the air inlet body, the air inlet body drives the carbon dioxide gas cylinder to be pressed on the weight sensors so as to weigh the carbon dioxide gas cylinder, and the dead weight of the carbon dioxide gas cylinder and the weight of an air inlet assembly are subtracted so as to calculate the carbon dioxide residual amount, and prompting is performed by means of the reminding device.

As a further improvement of the above technical solution, in the automatic gas filling mode, the longest gas filling time is 12 seconds.

As a further improvement of the above technical solution, in the calculation process of carbon dioxide residual amount calculation, it is determined as a large gas cylinder when the carbon dioxide gas cylinder is weighed to be heavier than 1635 g, wherein the total weight of the carbon dioxide gas is 880 g; it is determined as a small gas cylinder when the carbon dioxide gas cylinder is weighed to be in a range of 780-1635 g, wherein the total weight of the carbon dioxide gas is 380 g; and when the residual gas amount of the carbon dioxide gas cylinder is lower than a preset percentage, strong prompting is performed by means of the reminding device.

The invention has the beneficial effects as follows: the soda machine is safer to operate, cannot carry out automatic gas filling under the condition that the operation of the soda machine is not standard and can only carry out manual gas filling by a user under a special condition, so that the safety is higher; and meanwhile, the amount of residual carbon dioxide gas can be measured in real time according to the weight of the carbon dioxide gas cylinder, so that the user can conveniently prepare the standby carbon dioxide gas cylinder in time, and more convenience is achieved.

BRIEF DESCRIPTION OF THE DRAWINGS

The invention will be further explained below in conjunction with the description of the accompanying drawings and specific embodiments.

DESCRIPTION OF EMBODIMENTS

This section will describe the specific embodiments of the invention in detail. The preferred embodiments of the invention are shown in the accompanying drawings. The function of the accompanying drawings is to supplement the statement of the text part of the description with graphics, so that people can intuitively and vividly understand each technical feature and overall technical solution of the invention. However, the accompanying drawings shall not be construed as a limitation to the protection scope of the invention.

In the statement of the invention, it should be understood that orientation statements, such as orientation or position relationships indicated by up, down, front, back, left, right, etc., are based on the orientation or position relationships shown in the accompanying drawings and are only to facilitate the statement of the invention and simplify the statement, rather than indicate or imply that the device or element referred to must have a specific orientation, be constructed and operate in a specific orientation, and therefore should not be understood as a limitation to the invention.

In the statement of the invention, "several" means one or more, "a plurality of" means two or more, "greater than", "less than", and "more than", etc. are understood to exclude the original number, and above, below, within, etc. are understood to include the original number. If there is a statement of first and second, it is only for the purpose of distinguishing technical features, and cannot be understood as indicating or implying the relative importance or implicitly indicating the number of indicated technical features or implicitly indicating the order of indicated technical features.

In the statement of the invention, unless otherwise explicitly specified, words such as setting, mounting and connection should be understood in a broad sense. Those skilled in the art can reasonably determine the specific meanings of the above words in the invention in combination with the specific content of the technical solution.

Figure 1:
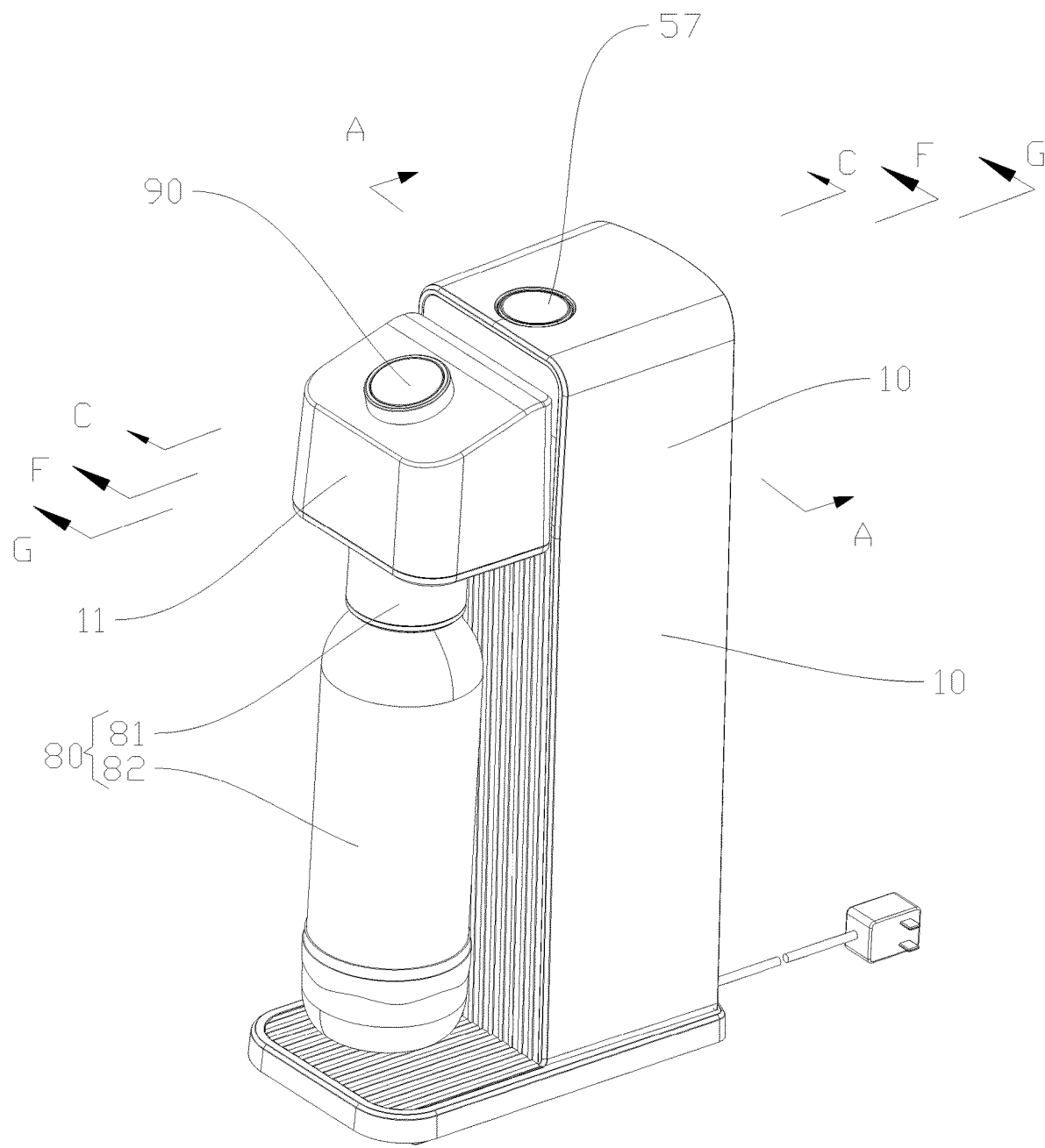
FIG. 1 is a structural schematic diagram of a preferred embodiment of the invention.
Figure 2:
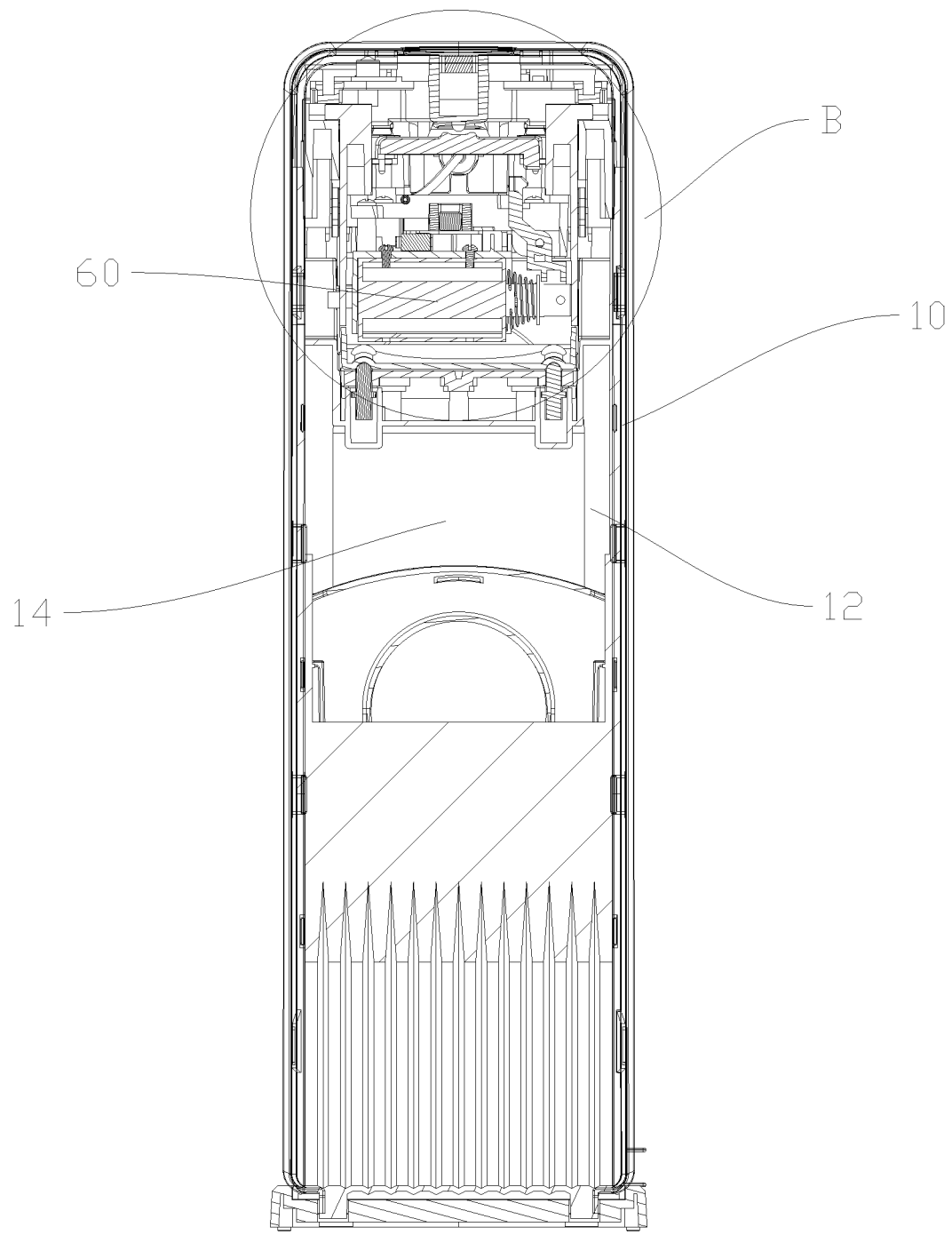
FIG. 2 is a structural schematic diagram of a profile in an A-A direction of FIG. 1.
Figure 3:
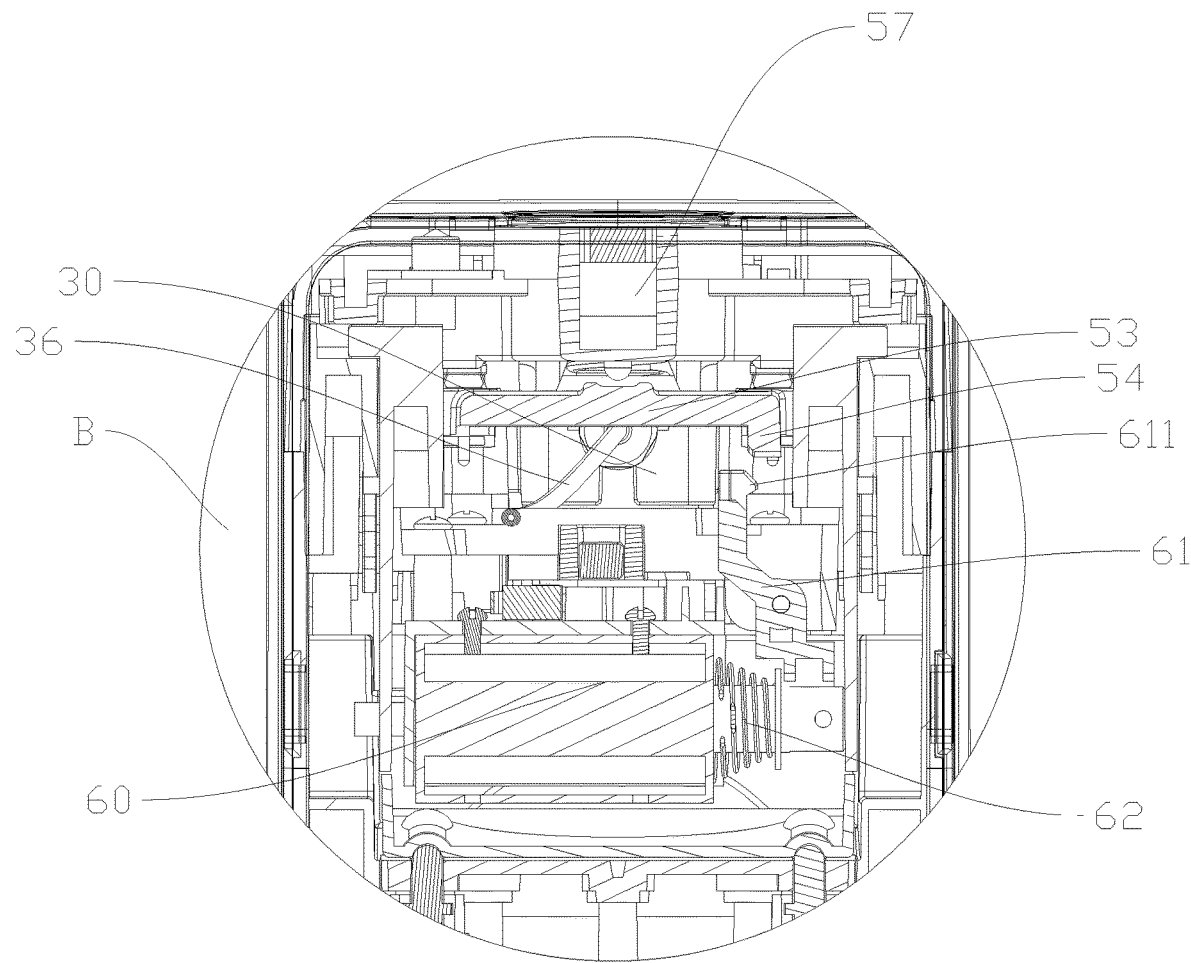
FIG. 3 is a partially enlarged structural schematic diagram at part B in FIG. 2.
Figure 4:
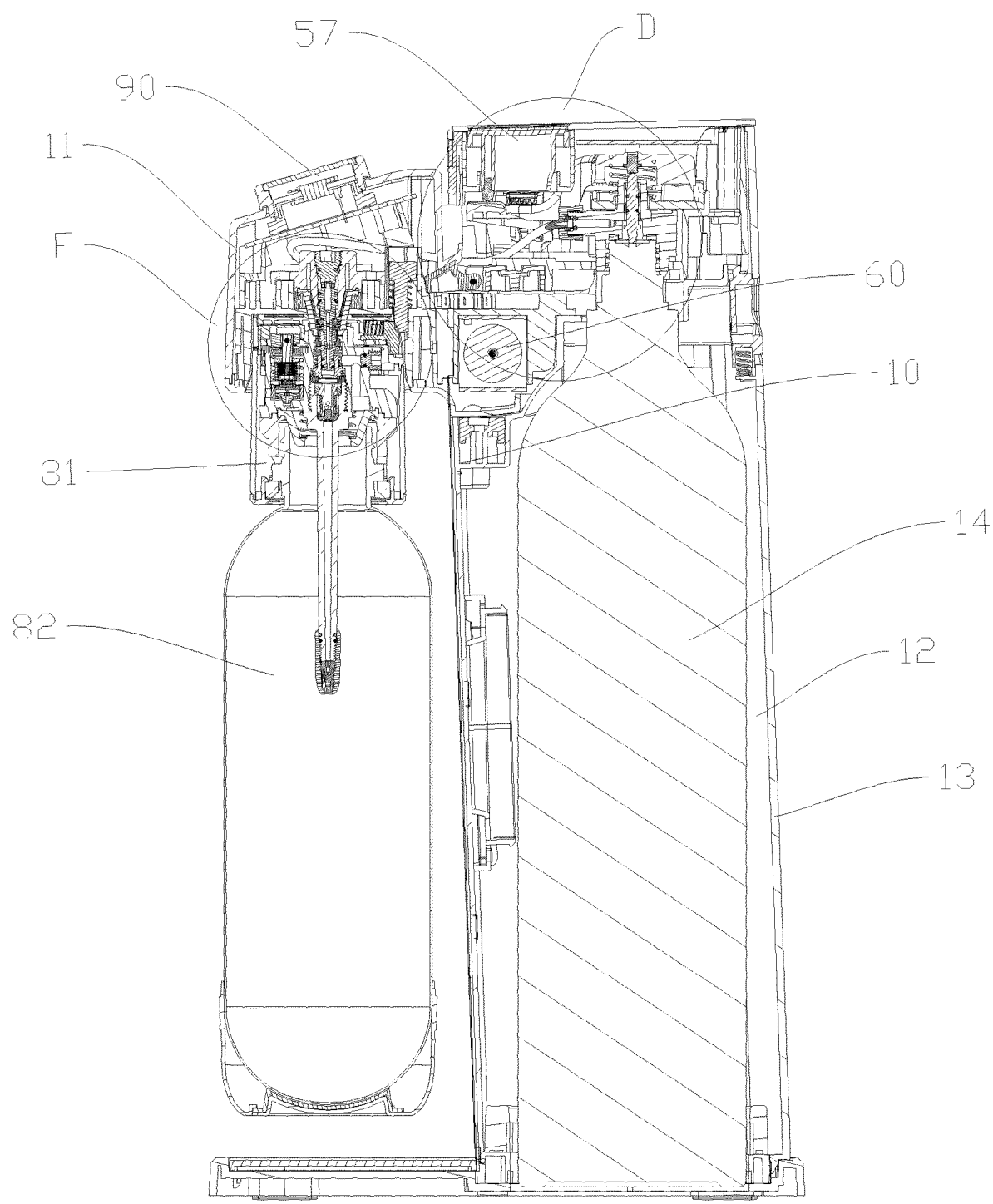
FIG. 4 is a structural schematic diagram of a profile in a C-C direction of FIG. 1.
Figure 5:
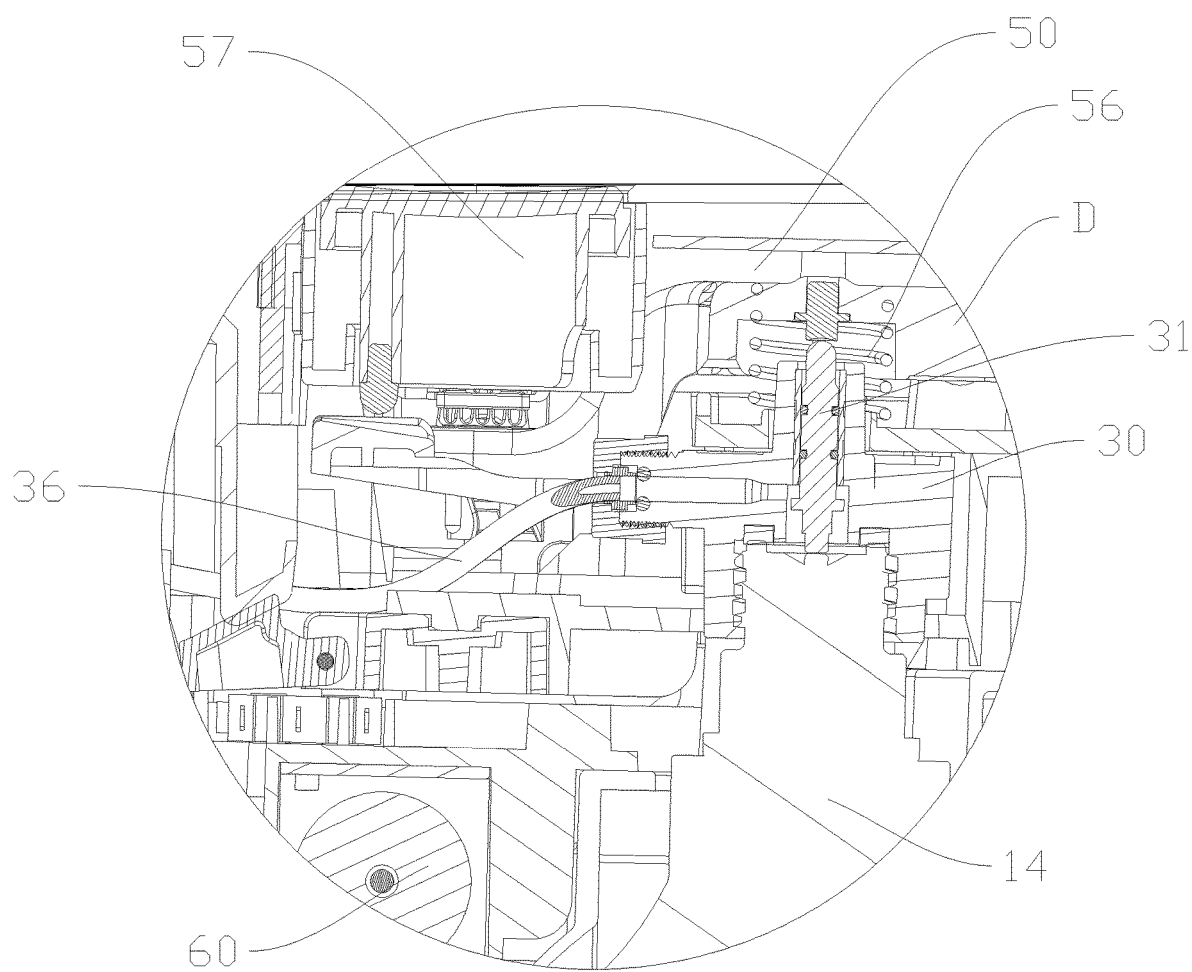
FIG. 5 is a partially enlarged structural schematic diagram at part D in FIG. 4.
Figure 6:
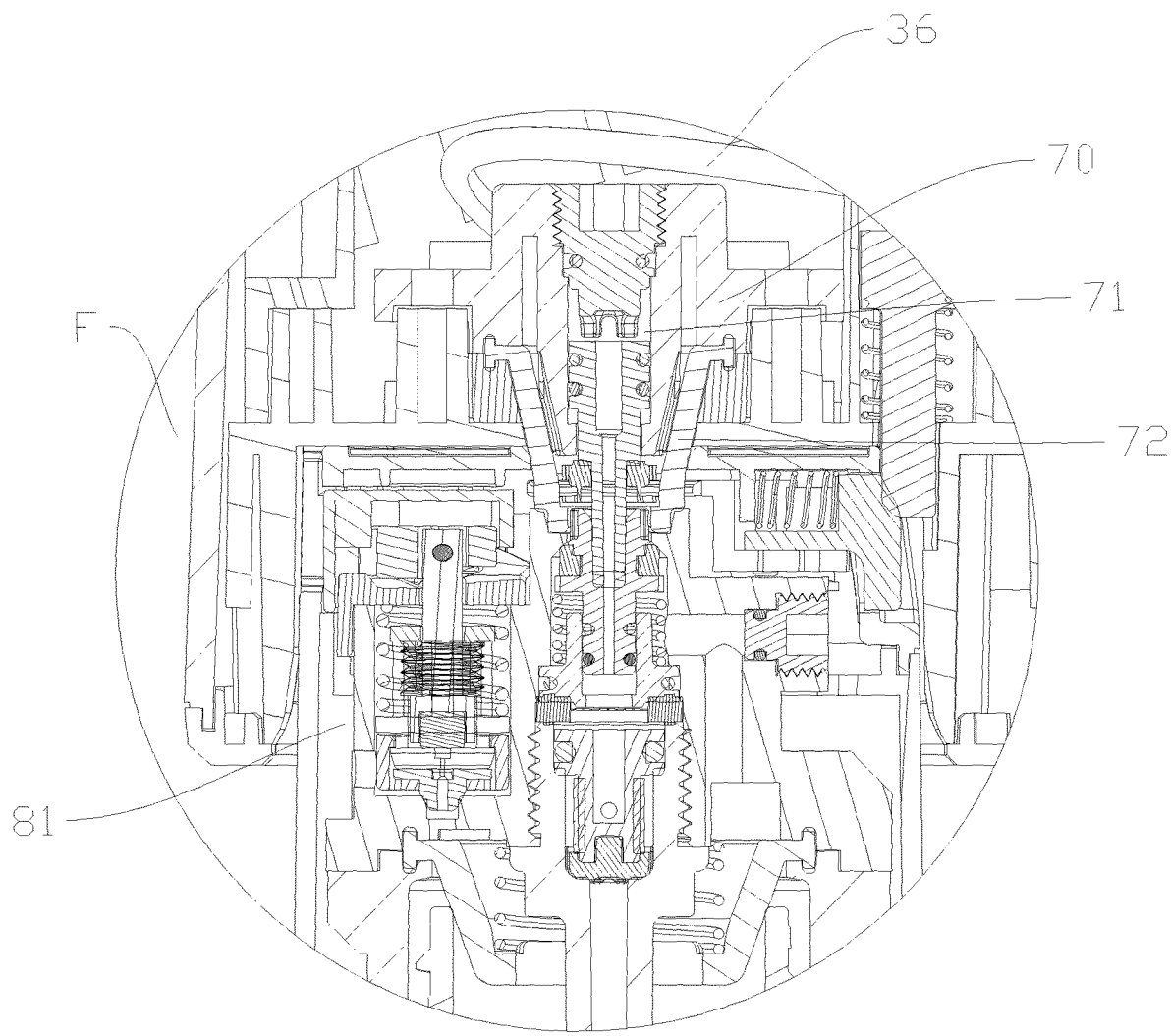
FIG. 6 is a partially enlarged structural schematic diagram at part E in FIG. 4.
Figure 7:
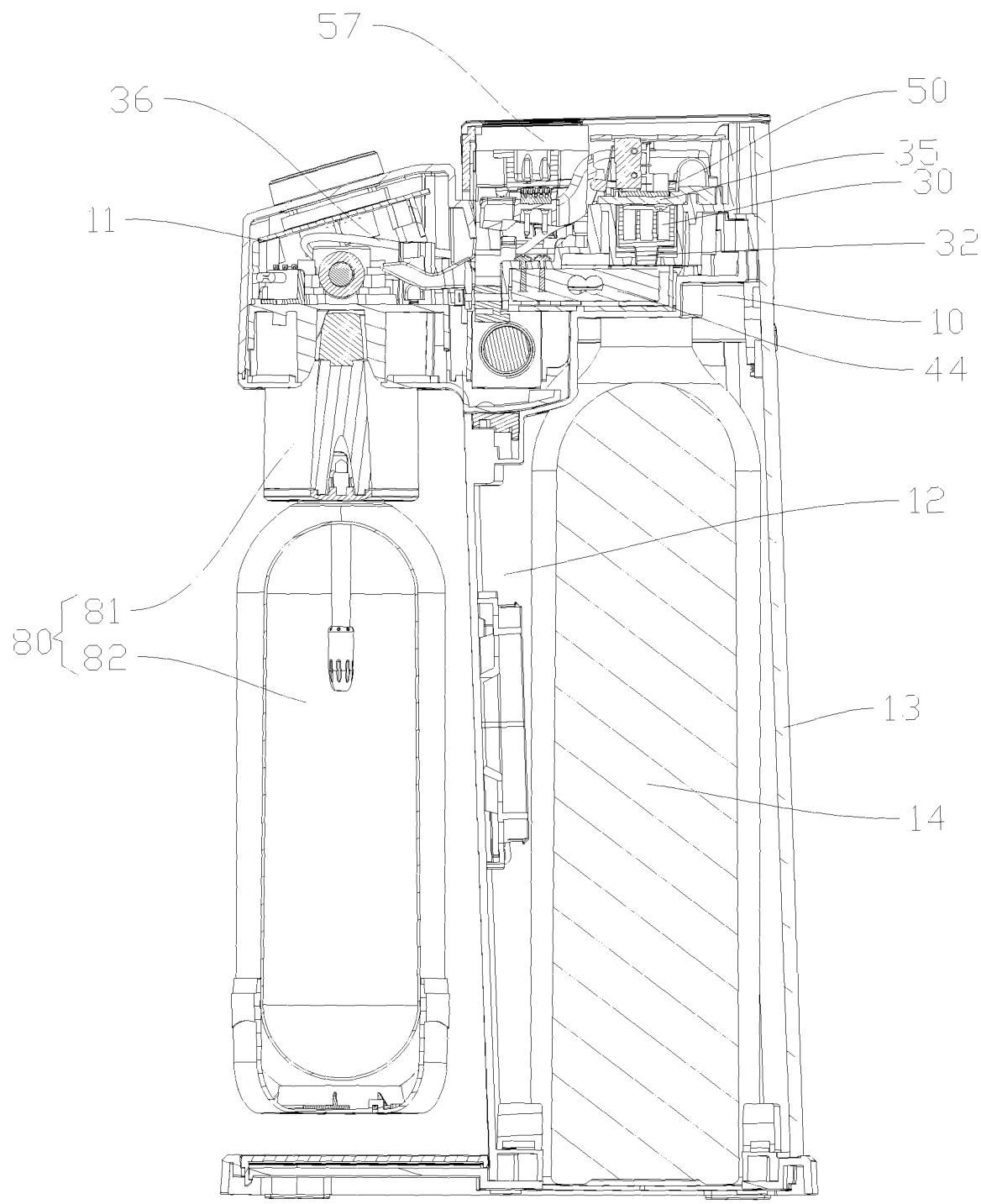
FIG. 7 is a structural schematic diagram of a profile in an F-F direction of FIG. 1.
Figure 8:
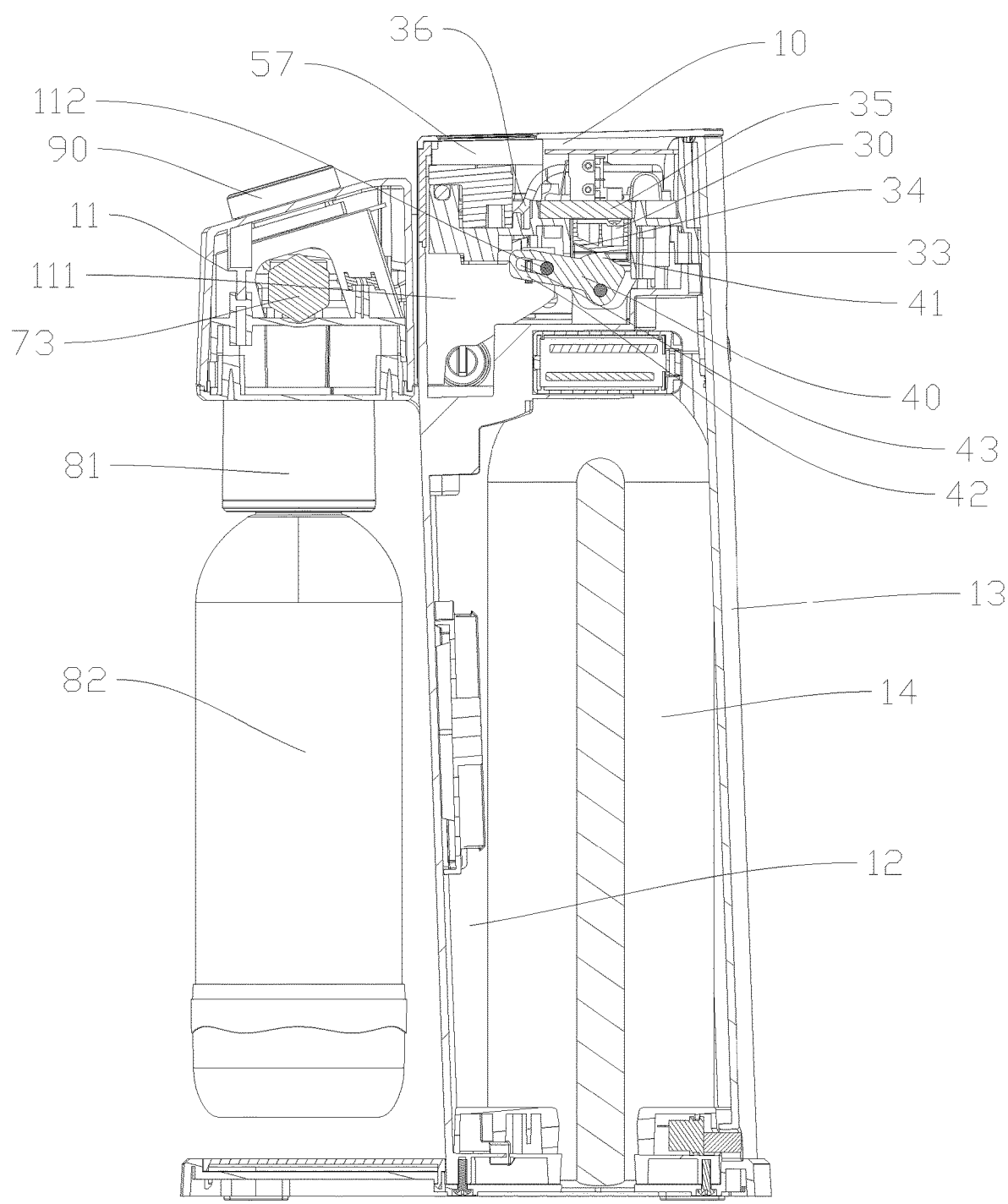
FIG. 8 is a structural schematic diagram of a profile in a G-G direction of FIG. 1.
Figure 9:
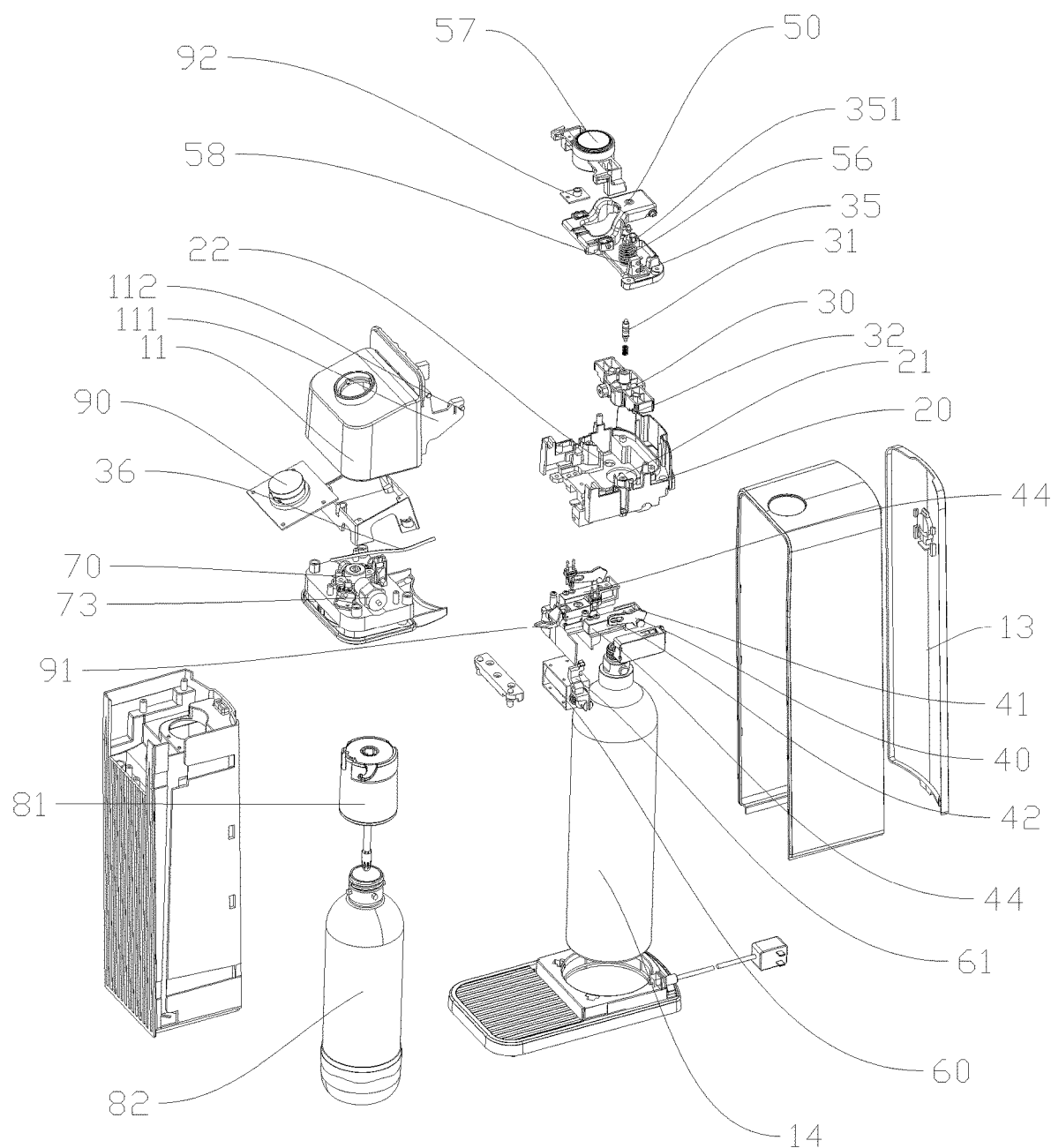
FIG. 9 is an exploded structural schematic diagram of the preferred embodiment of the invention.
Figure 10:
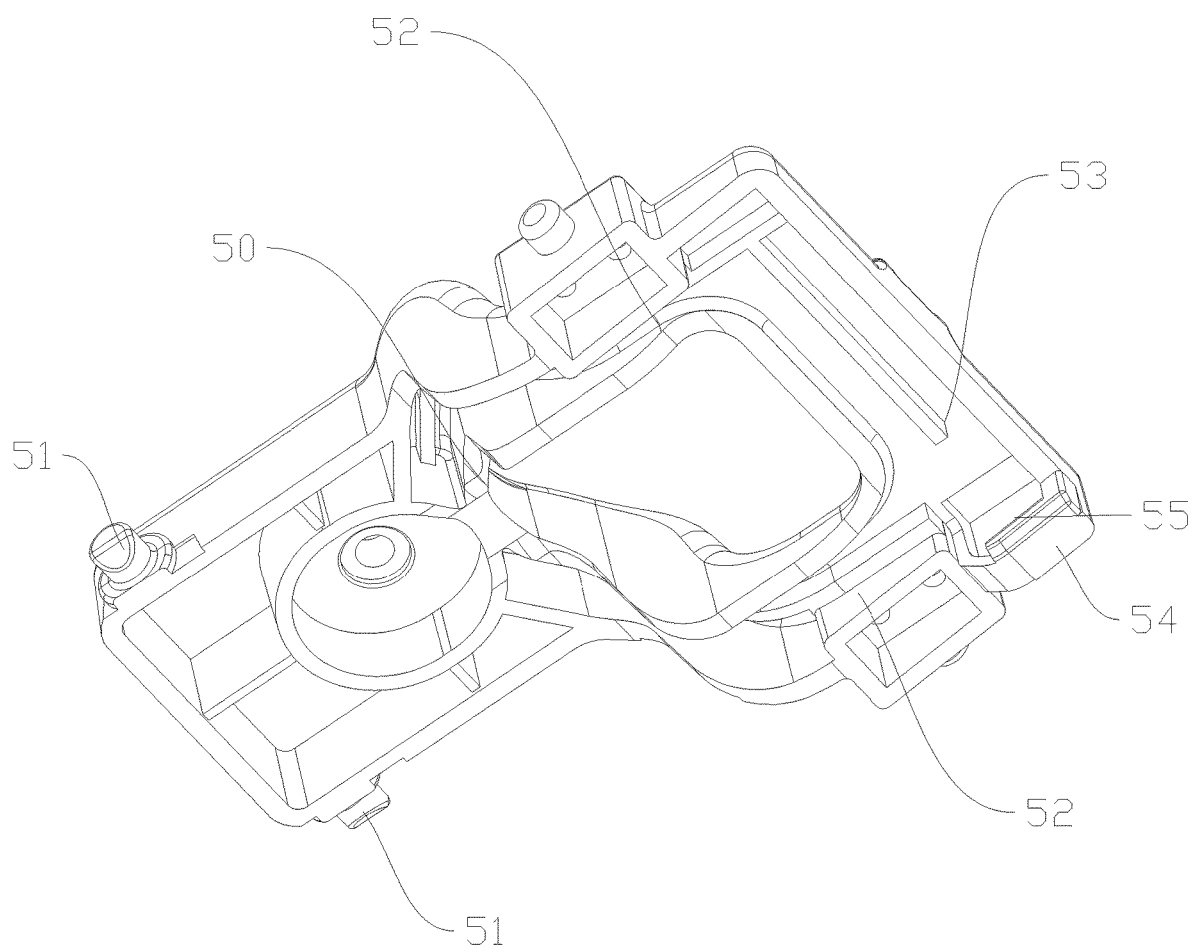
FIG. 10 is a structural schematic diagram of an air inlet pressing rod in the preferred embodiment of the invention.
Figure 11:
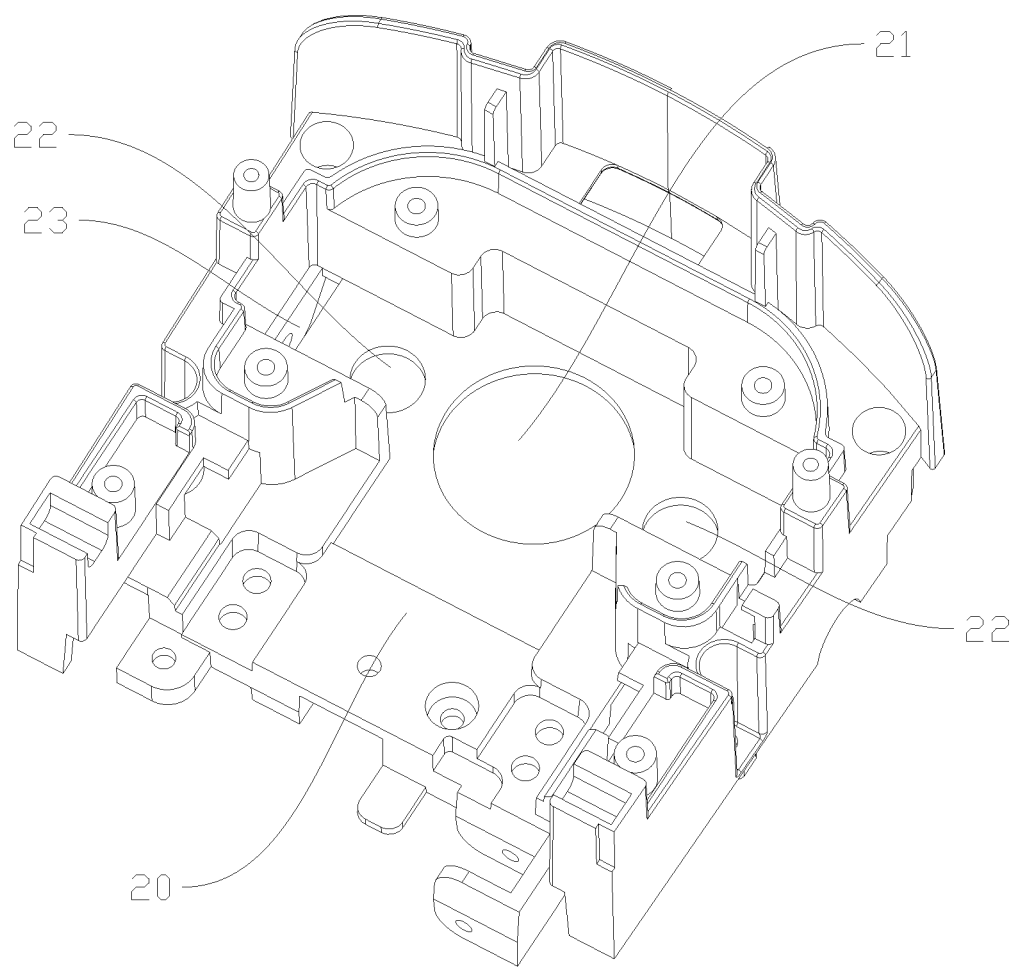
FIG. 11 is a structural schematic diagram of a body bracket in the preferred embodiment of the invention.
Figure 12:
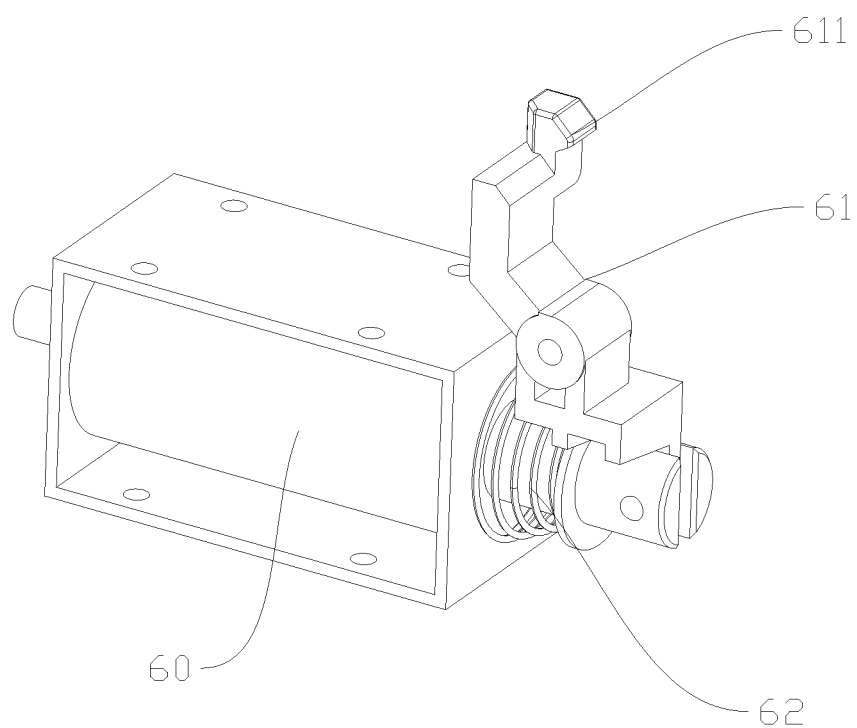
FIG. 12 is a structural schematic diagram of an electric control driver and a gas filling snap-fitting rod in the preferred embodiment of the invention.

Reference is made to FIG. 1 to FIG. 12. A soda machine with automatic gas filling and residual amount detection functions includes:

a body 10, wherein a body bracket 20 is provided in the main machine 10, and a reminding device is provided on the body 10;

an air inlet body 30, wherein the air inlet body 30 is provided on the body bracket 20 and is capable of moving up and down relative to the body bracket 20, a gas guide hole and an air inlet rod 31 located in the gas guide hole are provided in the air inlet body 30, and a gas cylinder joint for being connected to a carbon dioxide gas cylinder 14 is provided at a lower end of a mounting hole;

weight sensors 44, wherein the weight sensors 44 are provided below the air inlet body 30 to receive the air inlet body 30;

a support member 40, wherein the support member 40 is pivotally connected in the main machine 10, and a pushing end for jacking the air inlet body 30 from the weight sensors 44 and a driven end 42 for driving the support member 40 to swing are provided on the support member 40;

a machine head 11, wherein the machine head 11 is pivotally connected to the main machine 10 and is capable of swinging relative to the main machine 10, a machine head detection switch is provided in the main machine 10 or the machine head 11, a connection port is provided at the bottom of the machine head 11, a driving end 111 movably connected to the driven end 42 is provided on the machine head 11, a gas path body 70 is provided on the machine head 11, a gas path passage 71 is provided in the gas path body 70, a gas nozzle 72 in communication with the gas path passage 71 is provided at a lower end of the machine head 11, the gas path passage 71 is in communication with the gas guide hole by means of a gas guide pipe 36, and a pressure sensor 73 in communication with the gas path passage 71 is provided on the gas path body 70;

an air inlet pressing rod 50, wherein a tail end of the air inlet pressing rod 50 is pivotally connected in the main machine 10, the air inlet pressing rod 50 is located above the air inlet rod 31 and is configured to press the air inlet rod 31 downwards, an air inlet button 57 capable of moving up and down is provided on a surface of the main machine 10, the air inlet button 57 is located above the air inlet pressing rod 50 and is configured to press the air inlet pressing rod 50 downwards, and a snap-fitting hole 55 or a snap-fitting hook 611 is provided at the bottom of the air inlet pressing rod 50;

an electric control driver 60, wherein the electric control driver 60 is provided in the main machine 10 and is located below the air inlet pressing rod 50, a gas filling snap-fitting rod 61 is connected to an output end of the electric control driver 60, the middle of the gas filling snap-fitting rod 61 is pivotally connected in the main machine 10, a snap-fitting hook 611 or a snap-fitting hole 55 fitted with the snap-fitting hole 55 or the snap-fitting hook 611 is provided at a top end of the gas filling snap-fitting rod 61, the snap-fitting hook 611 is snap-fitted in the snap-fitting hole 55 in a swinging manner, and a guide surface is provided between outer side walls of the snap-fitting hook 611 and/or the snap-fitting hole 55;

an inductive switch 58, wherein the inductive switch 58 is provided at a lower end of the air inlet pressing rod 50, and the inductive switch 58 is triggered when the air inlet pressing rod 50 abuts against the air inlet rod 31;

a pressure water bottle assembly 80, where the pressure water bottle assembly 80 includes a submachine 81 and a bottle body 82, and the pressure water bottle assembly 80 is detachably mounted at the bottom of the machine head 11;

a tilting ball switch 92, wherein the tilting ball switch 92 is provided in the main machine 10 or in the machine head 11; and a water bottle detection switch, where the water bottle detection switch is provided at the bottom of the machine head 11 and is configured to abut against the pressure water bottle assembly 80 for detection.

Meanwhile, the solution further discloses a method for using the product, the method including a mounting method, a determination method and carbon dioxide residual amount calculation, wherein the mounting method is as follows: mounting the carbon dioxide gas cylinder 14 on the gas cylinder joint, swinging the machine head 11 upwards, mounting a soda bottle on the connection port of the machine head 11, resetting the machine head 11 downwards, pressing the air inlet button 57 to enable an automatic gas filling mode to inject carbon dioxide gas into the soda bottle for preparation of soda water, switching to a manual gas filling mode when the automatic gas filling mode cannot be enabled, driving, by means of the machine head 11, the support member 40 to swing in an upward swinging process, such that the pushing end jacks the air inlet body 30, the air inlet body 30 drives the carbon dioxide gas cylinder 14 to be pressed on the weight sensors 44 so as to weigh the carbon dioxide gas cylinder 14, and the dead weight of the carbon dioxide gas cylinder 14 and the weight of an air inlet assembly are subtracted so as to calculate the carbon dioxide residual amount, and prompting is performed by means of the reminding device, where in the automatic gas filling mode, the electric control driver 60 drives the gas filling snap-fitting rod 61 to move to an operation position, then the snap-fitting hole 55 and the snap-fitting hook 611 overlap each other to a certain extent in a horizontal direction, the air inlet button 57 is pressed so as to drive the air inlet pressing rod 50 to be pressed downwards, the gas filling snap-fitting rod 61 overcomes the force, brought by the electric control driver 60, to swing under the action of the air inlet pressing rod 50, the gas filling snap-fitting rod 61 is continuously pressed downwards, when the snap-fitting hook 611 and the snap-fitting hole 55 overlap each other, the gas filling snap-fitting rod 61 swings continuously under the action of the electric control driver 60 to enable the snap-fitting hook 611 to be snap-fitted in the snap-fitting hole 55 to fix the air inlet pressing rod 50, so as to automatically and continuously press the air inlet rod 31 downwards, when the downward pressing time reaches specified time or a pressure value is reached in the pressure water bottle assembly 80, the electric control driver 60 drives the gas filling snap-fitting rod 61 to swing to be reset, the air inlet pressing rod 50 is released, thereby allowing the air inlet pressing rod 50 to be reset, the pressure value can be adjusted manually, thereby preparing soda water of different concentrations, meanwhile, the specified pressurizing time can prevent the explosion caused by excessive gas filling, and preferably, in the automatic gas filling mode, the longest gas filling time is 12 s;

in the manual gas filling mode, the gas filling snap-fitting rod 61 is located in an initial position, and the air inlet button 57 is pressed continuously, such that the air inlet pressing rod 50 continuously presses the air inlet rod 31 downwards under the manual action;

the following determination will be performed when enabling the automatic gas filling mode and in the automatic gas filling mode:

1. determining whether the soda machine is connected to a power supply, and if the soda machine is not connected to the power supply, the electric control driver 60 is not energized and the automatic gas filling mode is unable to be enabled;
2. determining a tilt angle of the soda machine by means of the tilting ball switch 92, and if the tilt of the soda machine exceeds a specified value, the automatic gas filling mode is unable to be enabled or the automatic gas filling mode is disabled, and during conventional use, it is generally defined that there is a risk of tilting when the tilt angle of the soda machine exceeds 15 degrees;
3. determining whether the pressure water bottle assembly 80 is mounted, if the pressure water bottle assembly 80 is not mounted on the machine head 11, the pressure water bottle assembly 80 is unable to be detected by the water bottle detection switch, such that the soda machine is unable to enable the automatic gas filling mode;
4. determining whether the machine head 11 is reset, if the machine head 11 is not reset to a specified position by swinging downwards and the machine head 11 is unable to be detected by the machine head detection switch, such that the soda machine is unable to enable the automatic gas filling mode;
5. in the automatic gas filling mode, if no pressure rise is detected by the pressure sensor 73, it is determined that the bottle body 82 of the pressure water bottle assembly 80 is not mounted, and the automatic gas filling mode is disabled;
6. in the automatic gas filling mode, if a slow pressure rise is detected by the pressure sensor 73, it is determined that the gas amount of the carbon dioxide gas cylinder 14 is insufficient, and prompting is performed by means of the reminding device; and
7. in the automatic gas filling mode, if a certain pressure rise is detected by the pressure sensor 73 but the specified pressure is never reached, it is determined that there is a gas leakage fault, and prompting is performed by means of the reminding device.

Compared with the prior art, the soda machine is safer to operate, the automatic gas filling mode cannot be enabled under the condition that the operation of the soda machine is not standard and, only the manual gas refilling mode can be enabled, while the manual gas filling mode needs to be performed by a user under a special condition, thus, at this time, the user's attention will be focused on the use of the carbonated water maker, dangers do not occur easily, so that the safety is higher; and meanwhile, the amount of residual carbon dioxide gas can be measured in real time according to the weight of the carbon dioxide gas cylinder 14, so that the user can conveniently prepare the standby carbon dioxide gas cylinder 14 in time, and more convenience is achieved.

There are various specifications of carbon dioxide gas cylinders 14, such that in a weighing process, the user can manually input the specifications of the gas cylinders; in order to optimize the operation process, preferably, when the carbon dioxide gas cylinders 14 are weighed, the large and small gas cylinders can be automatically recognized by the soda machine according to the measured weight, for example, the empty bottle weight of the carbon dioxide gas cylinder 14 in 0.6 L is 780 g, the gas weight is 380 g, and the total weight is 1160 g; the empty bottle weight of the carbon dioxide gas cylinder 14 in 1.34 L is 1635 g, the gas weight is 880 g, and the total weight is 2515 g; when the total weight exceeds the empty bottle weight of the carbon dioxide gas cylinder 14 in 1.34 L, the gas cylinder is determined as the large gas cylinder by a system, and vice versa as the small gas cylinder; and after the large and small gas cylinders are recognized, the dead weight of the carbon dioxide gas cylinder 14 and the weight of the air inlet body are subtracted by the system, and the residual weight is the weight of the carbon dioxide gas. Preferably, when the residual gas amount of the carbon dioxide gas cylinder 14 is lower than a preset percentage, strong prompting is performed by means of the reminding device.

In the solution, preferably, a connection hole 21 for accommodating the gas cylinder joint is provided in the middle of the body bracket 20, limiting holes 22 located on two sides of the connection hole 21 are provided in the body bracket 20, platens 32 located in the limiting holes 22 are provided at a lower end of the air inlet body 30, there are two weight sensors 44 which are located below the two limiting holes 22, respectively, an upward embedding groove 23 is provided at a lower end of the body bracket 20, the top of the embedding groove 23 is in communication with an upper end surface of the body bracket 20, the support member 40 is pivotally connected in the embedding groove 23 by means of a pivoting shaft, and the pushing end extends to the upper end of the body bracket 20 through the top of the embedding groove 23 and is located at the bottom of the air inlet body 30 so as to support the air inlet body 30; the displacement of the air inlet body 30 is limited by means of the connection hole 21 and the limiting holes 22, such that the air inlet body can only move up and down, and the air inlet body is vertically adjusted by means of the support member 40; and when the pushing end is located at the lowest point, the pushing end is not in contact with the bottom of the air inlet body 30, and meanwhile, the platens 32 are completely pressed against the weight sensors 44.

There can also be three or more weight sensors 44, the weight sensors 44 can also be directly received at the bottom of the air inlet body 30, or wings are provided on two sides of the air inlet body 30, the weight sensors 44 are located at lower ends of the wings, and the specific number and arrangement layout of the weight sensors 44 can be changed organically according to actual needs.

Preferably, the support member 40 is in a sheet shape, and the pushing end is a pushing protrusion 41 provided on the support member 40. The pushing end can also be a pushing rod taking a pivot point of the support member 40 as the center and eccentrically provided on an end surface of the support member 40, such that the height of the pushing rod can be driven to change in the swinging process of the support member 40.

Preferably, an abutting surface 33 and an avoiding position 34 located on one side of the abutting surface 33 and recessed inwards are provided at the bottom of the air inlet body 30, and the avoiding position 34 is in smooth transition with the abutting surface 33, such that the pushing end can abut against the abutting surface 33 in the swinging process so as to support the air inlet body 30 or can move into the avoiding position 34 along the abutting surface 33.

The driving end 111 can be connected to the driven end 42 in various manners, preferably, a pin 112 is provided at the driving end 111, a strip-shaped groove 43 is provided in the driving end 42, and the pin 112 is inserted in the strip-shaped groove 43 and moves in the strip-shaped groove 43. Thus, in the process of the machine head 11 driving the driving end 111 to swing, the pin 112 can move in the strip-shaped groove 43, thereby driving the driven end 42 to swing.

In an implementation, the movable connection style of the driving end 111 and the driven end 42 is shown as pivotally connecting a telescopic rod to the driving end 111, the other end of the telescopic rod is pivotally connected to the driven end 42, thereby forming a crank connection rod 53 structure for driving.

As a further optimization, in order to better mount the air inlet pressing rod 50, preferably, an air inlet gland 35 is provided on the air inlet body 30, two opposite pivoting shaft holes 351 are provided in an upper surface of the air inlet gland 35, a through hole for accommodating the air inlet rod 31 is provided in the middle of the air inlet gland 35, two pivoting columns 51 respectively movably inserted in the two pivoting shaft holes 351 are provided at the tail end of the air inlet pressing rod 50, and the air inlet rod 31 is located at a lower end of the middle of the air inlet pressing rod 50.

In an implementation, an end portion of the air inlet pressing rod 50 can be directly and pivotally connected to an inner side wall of the main machine 10.

The air inlet pressing rod 50 can rebound automatically under the rebounding action of an ejector pin on the carbon dioxide gas cylinder 14. Considering increasing the reset elasticity to prevent the air inlet pressing rod 50 from being pressed against the air inlet rod 31 for a long time, preferably, a first reset spring 56 abutting against the bottom of the air inlet pressing rod 50 is provided on a surface of the air inlet gland 35.

The electric control driver 60 can be selected to be in the type of automatic reset upon a power outage. However, considering increasing the response speed, preferably, a second reset spring 62 for driving the gas filling snap-fitting rod 61 to be reset is provided on the electric control driver 60, such that in case of the power outage, the second reset spring 62 can quickly drive the gas filling snap-fitting rod 61 to be reset. The electric control driver 60 is preferably an electromagnetic valve, and the electric control driver 60 can also be selected as a linear motor and other implementations.

In the above solution, preferably, two supporting feet 52 provided symmetrically and expanding downwards are located at a front end of the air inlet pressing rod 50, end portions of the two supporting feet 52 are connected by means of a connection rod 53, a cylinder platform 54 is provided at the bottom of one of the supporting feet 52, the snap-fitting hole 55 is provided in a side surface of the cylinder platform 54, the air inlet button 57 is located above the connection rod 53, preferably, the air inlet button 57 is sleeved with an air inlet button bracket, and the air inlet button bracket is pivotally connected to outer sides of the two supporting feet 52.

In this solution, the machine head detection switch, the inductive switch 58 and the water bottle detection switch are preferably inching switches. The machine head detection switch, the inductive switch 58 and the water bottle detection switch can also be selected as electricity connection rods and breakpoint circuits fitted with the electricity connection rods, and the circuits can only be turned on when the electricity connection rods are in contact with breakpoint circuits. The machine head detection switch, the inductive switch 58 and the water bottle detection switch can also be selected as touch switches and other implementations.

As a further optimization, preferably, the reminding device is a display screen 90 provided on a surface of the main machine 10 or the machine head 11, such that the carbon dioxide residual amount and fault causes are displayed more directly. The reminding device can be in the form of an indicator light or in the form of a voice speaker.

Preferably, a rotation stopping pressing rod 91 extending into the machine head 11 is further provided on the main machine 10, such that when the machine head 11 is reset to a specified state, the rotation stopping pressing rod 91 abuts against the interior of the machine head 11 so as to limit further swinging of the machine head 11.

Preferably, a gas cylinder cavity 12 located below the air inlet body 30 is provided in the main machine 10, an opening is provided in one end of the gas cylinder cavity 12, and a rear cover 13 is movably provided on the opening, thereby accommodating the carbon dioxide gas cylinder 14 conveniently.

Preferably, a backup battery is provided in the main machine 10, such that in case of a power outage, the carbon dioxide gas cylinder 14 can also be weighed.

The above are only preferred embodiments of the invention, and are not intended to limit the patent scope of the invention. Under the invention concept of the invention, equivalent structural transformations made using the contents of the description and drawings of the invention, or directly or indirectly used in other relevant technical fields are all included in the patent protection scope of the invention.

What is claimed is:
1. A soda machine with automatic gas filling and residual amount detection functions, comprising:
    a main machine (10), wherein a body bracket (20) is provided in the main machine (10), and a reminding device is provided on the main machine (10);
    an air inlet body (30), wherein the air inlet body (30) is provided on the body bracket (20) and is capable of moving up and down relative to the body bracket (20), a gas guide hole and an air inlet rod (31) located in the gas guide hole are provided in the air inlet body (30), and a gas cylinder joint for being connected to a carbon dioxide gas cylinder (14) is provided at a lower end of a mounting hole;
    weight sensors (44), wherein the weight sensors (44) are provided below the air inlet body (30) to receive the air inlet body (30);
    a support member (40), wherein the support member (40) is pivotally connected in the main machine (10), and a pushing end for jacking the air inlet body (30) from the weight sensors (44) and a driven end (42) for driving the support member (40) to swing are provided on the support member (40);
    a machine head (11), wherein the machine head (11) is pivotally connected to the main machine (10) and is capable of swinging relative to the main machine (10), a machine head detection switch is provided in the main machine (10) or the machine head (11), a connection port is provided at the bottom of the machine head (11), a driving end (111) movably connected to the driven end (42) is provided on the machine head (11), a gas path body (70) is provided on the machine head (11), a gas path passage (71) is provided in the gas path body (70), a gas nozzle (72) in communication with the gas path passage (71) is provided at a lower end of the machine head (11), the gas path passage (71) is in communication with the gas guide hole by means of a gas guide pipe (36), and a pressure sensor (73) in communication with the gas path passage (71) is provided on the gas path body (70);
    an air inlet pressing rod (50), wherein a tail end of the air inlet pressing rod (50) is pivotally connected in the main machine (10), the air inlet pressing rod (50) is located above the air inlet rod (31) and is configured to press the air inlet rod (31) downwards, an air inlet button (57) capable of moving up and down is provided on a surface of the main machine (10), the air inlet button (57) is located above the air inlet pressing rod (50) and is configured to press the air inlet pressing rod (50) downwards, and a snap-fitting hole (55) or a snap-fitting hook (611) is provided at the bottom of the air inlet pressing rod (50);
    an electric control driver (60), wherein the electric control driver (60) is provided in the main machine (10) and is located below the air inlet pressing rod (50), a gas filling snap-fitting rod (61) is connected to an output end of the electric control driver (60), the middle of the gas filling snap-fitting rod (61) is pivotally connected in the main machine (10), a snap-fitting hook (611) or a snap-fitting hole (55) fitted with the snap-fitting hole (55) or the snap-fitting hook (611) is provided at a top end of the gas filling snap-fitting rod (61), the snap-fitting hook (611) is snap-fitted in the snap-fitting hole (55) in a swinging manner, and a guide surface is provided between outer side walls of the snap-fitting hook (611) and/or the snap-fitting hole (55);
    an inductive switch (58), wherein the inductive switch (58) is provided at a lower end of the air inlet pressing rod (50), and the inductive switch (58) is triggered when the air inlet pressing rod (50) abuts against the air inlet rod (31);
    a pressure water bottle assembly (80), wherein the pressure water bottle assembly (80) comprises a submachine (81) and a bottle body (82), and the pressure water bottle assembly (80) is detachably mounted at the bottom of the machine head (11);
    a tilting ball switch (92), wherein the tilting ball switch (92) is provided in the main machine (10) or in the machine head (11); and
    a water bottle detection switch, wherein the water bottle detection switch is provided at the bottom of the machine head (11) and is configured to abut against the pressure water bottle assembly (80) for detection.

2. The soda machine with automatic gas filling and residual amount detection functions of claim 1, wherein
    a connection hole (21) for accommodating the gas cylinder joint is provided in the middle of the body bracket (20), limiting holes (22) located on two sides of the connection hole (21) are provided in the body bracket (20), platens (32) located in the limiting holes (22) are provided at a lower end of the air inlet body (30), there are two weight sensors (44) which are located below the two limiting holes (22), respectively, an upward embedding groove (23) is provided at a lower end of the body bracket (20), the top of the embedding groove (23) is in communication with an upper end surface of the body bracket (20), the support member (40) is pivotally connected in the embedding groove (23) by means of a pivoting shaft, and the pushing end extends to the upper end of the body bracket (20) through the top of the embedding groove (23) and is located at the bottom of the air inlet body (30) so as to support the air inlet body (30).

3. The soda machine with automatic gas filling and residual amount detection functions of claim 1, wherein
a pin (112) is provided on the driving end (111), a strip-shaped groove (43) is provided at the driving end (42), and the pin (112) is inserted in the strip-shaped groove (43) and moves in the strip-shaped groove (43).

4. The soda machine with automatic gas filling and residual amount detection functions of claim 1, wherein
an air inlet gland (35) is provided on the air inlet body (30), two opposite pivoting shaft holes (351) are provided in an upper surface of the air inlet gland (35), a through hole for accommodating the air inlet rod (31) is provided in the middle of the air inlet gland (35), two pivoting columns (51) respectively movably inserted in the two pivoting shaft holes (351) are provided at the tail end of the air inlet pressing rod (50), and the air inlet rod (31) is located at a lower end of the middle of the air inlet pressing rod (50).

5. The soda machine with automatic gas filling and residual amount detection functions of claim 4, wherein
a first reset spring (56) abutting against the bottom of the air inlet pressing rod (50) is provided on a surface of the air inlet gland (35), and a second reset spring (62) for driving the gas filling snap-fitting rod (61) to be reset is provided on the electric control driver (60).

6. The soda machine with automatic gas filling and residual amount detection functions of claim 1, wherein
two supporting feet (52) provided symmetrically and expanding downwards are located at a front end of the air inlet pressing rod (50), end portions of the two supporting feet (52) are connected by means of a connection rod (53), a cylinder platform (54) is provided at the bottom of one of the supporting feet (52), the snap-fitting hole (55) is provided in a side surface of the cylinder platform (54), and the air inlet button (57) is located above the connection rod (53).

7. The soda machine with automatic gas filling and residual amount detection functions of claim 1, wherein
the machine head detection switch, the inductive switch (58) and the water bottle detection switch are all inching switches.

8. The soda machine with automatic gas filling and residual amount detection functions of claim 1, wherein
the reminding device is a display screen (90) provided on a surface of the main machine (10) or the machine head (11).

9. A use method of the soda machine with automatic gas filling and residual amount detection functions of claim 1, comprising a mounting method, a determination method and carbon dioxide residual amount calculation, wherein the mounting method is as follows: mounting the carbon dioxide gas cylinder (14) on the gas cylinder joint, swinging the machine head (11) upwards, mounting a soda bottle on the connection port of the machine head (11), resetting the machine head (11) downwards, pressing the air inlet button (57) to enable an automatic gas filling mode to inject carbon dioxide gas into the soda bottle for preparation of soda water, and switching to a manual gas filling mode when the automatic gas filling mode cannot be enabled, wherein in the automatic gas filling mode, the electric control driver (60) drives the gas filling snap-fitting rod (61) to move to an operation position, the air inlet button (57) is pressed so as to drive the air inlet pressing rod (50) to be pressed downwards, the electric control driver (60) drives the gas filling snap-fitting rod (61) and the air inlet pressing rod (50) to be fixed by means of the snap-fitting hole (55) and the snap-fitting hook (611), so as to automatically and continuously press the air inlet rod (31) downwards, when the downward pressing time reaches specified time or a pressure value is reached in the pressure water bottle assembly (80), the electric control driver (60) drives the gas filling snap-fitting rod (61) to swing to be reset, the air inlet pressing rod (50) is released, thereby allowing the air inlet pressing rod (50) to be reset; and in the manual gas filling mode, the gas filling snap-fitting rod (61) is located in an initial position, and the air inlet button (57) is pressed continuously, such that the air inlet pressing rod (50) continuously presses the air inlet rod (31) downwards under the manual action;

the determination method is as follows:

determining whether the soda machine is connected to a power supply, and if the soda machine is not connected to the power supply, the electric control driver (60) is not energized and the automatic gas filling mode is unable to be enabled;

determining a tilt angle of the soda machine by means of the tilting ball switch (92), and if the tilt of the soda machine exceeds a specified value, the automatic gas filling mode is unable to be enabled or the automatic gas filling mode is disabled;

determining whether the pressure water bottle assembly (80) is mounted, if the pressure water bottle assembly (80) is not mounted on the machine head (11), the pressure water bottle assembly (80) is unable to be detected by the water bottle detection switch, such that the soda machine is unable to enable the automatic gas filling mode; and determining whether the machine head (11) is reset, if the machine head (11) is not reset to a specified position by swinging downwards and the machine head (11) is unable to be detected by the machine head detection switch, such that the soda machine is unable to enable the automatic gas filling mode, wherein in the automatic gas filling mode, if no pressure rise is detected by the pressure sensor (73), it is determined that the bottle body (82) of the pressure water bottle assembly (80) is not mounted, and the automatic gas filling mode is disabled;

in the automatic gas filling mode, if a slow pressure rise is detected by the pressure sensor (73), it is determined that the gas amount of the carbon dioxide gas cylinder (14) is insufficient, and prompting is performed by means of the reminding device; and in the automatic gas filling mode, if a certain pressure rise is detected by the pressure sensor (73) but the specified pressure is never reached, it is determined that there is a gas leakage fault, and prompting is performed by means of the reminding device; and the carbon dioxide residual amount calculation is as follows: driving, by means of the machine head (11), the support member (40) to swing in an upward swinging process, such that the pushing end jacks the air inlet body (30), the air inlet body (30) drives the carbon dioxide gas cylinder (14) to be pressed on the weight sensors (44) so as to weigh the carbon dioxide gas cylinder (14), and the dead weight of the carbon dioxide gas cylinder (14) and the weight of an air inlet assembly are subtracted so as to calculate the carbon dioxide residual amount, and prompting is performed by means of the reminding device.

10. The use method of the soda machine with automatic gas filling and residual amount detection functions of claim 9, wherein
in the automatic gas filling mode, the longest gas filling time is 12 s.

11. The use method of the soda machine with automatic gas filling and residual amount detection functions of claim 9, wherein
in the calculation process of carbon dioxide residual amount calculation, it is determined as a large gas cylinder when the carbon dioxide gas cylinder (14) is weighed to be heavier than 1635 g, wherein the total weight of the carbon dioxide gas is 880 g; it is determined as a small gas cylinder when the carbon dioxide gas cylinder (14) is weighed to be in a range of 780-1635 g, wherein the total weight of the carbon dioxide gas is 380 g; and when the residual gas amount of the carbon dioxide gas cylinder (14) is lower than a preset percentage, strong prompting is performed by means of the reminding device.

* * * * *